United States Patent [19]

Denholm et al.

[11] 4,274,868
[45] Jun. 23, 1981

[54] RECOVERY OF TIN FROM ORES OR OTHER MATERIALS

[75] Inventors: William T. Denholm, Camberwell; Kevin A. Foo, Carnegie, both of Australia

[73] Assignees: Commonwealth Scientific and Industrial Research Organization; Aberfoyle Services Pty. Ltd., both of Australia

[21] Appl. No.: 65,274

[22] Filed: Aug. 9, 1979

Related U.S. Application Data

[63] Continuation-in-part of Ser. No. 841,388, Oct. 12, 1977, abandoned.

[51] Int. Cl.³ .................... C01G 19/00; C01G 19/02
[52] U.S. Cl. .......................................... 75/21; 75/76; 75/83; 423/96
[58] Field of Search .................. 423/96, 561; 75/72, 75/21, 76, 83

[56] References Cited

FOREIGN PATENT DOCUMENTS 2736511 2/1978 Fed. Rep. of Germany .
1391572 1/1973 United Kingdom .

Primary Examiner—O. R. Vertiz
Assistant Examiner—Wayne A. Langel
Attorney, Agent, or Firm—Bacon & Thomas

[57] ABSTRACT

Process for recovering tin or other non-ferrous metal values from low-grade ores, concentrates, or mineral mixes which consist mainly of iron sulphide minerals. The ore is added to a two-phase reactor containing liquid iron sulphide matte and a liquid iron silicate slag, and tin volatilization is achieved by a process akin to matte conversion.

12 Claims, 1 Drawing Figure

ANALYSES OF DIP SAMPLES TAKEN DURING TESTS

ANALYSES OF DIP SAMPLES TAKEN DURING TESTS

RECOVERY OF TIN FROM ORES OR OTHER MATERIALS

This application is a continuation-in-part of application Ser. No. 841,388, filed Oct. 12, 1978 abandoned.

BACKGROUND OF THE INVENTION

This invention relates to an improved process for recovering tin or other non-ferrous metal values from low-grade ores, concentrates, or mineral mixes which consist mainly of iron sulphide minerals.

Conventional tin smelting processes are applied to essentially sulphide-free, high grade concentrates such as those derived from alluvial sources, containing tin in excess of 60%. These concentrates, which are prepared by conventional mineral dressing methods are treated in a two stage reverberatory furnace operation. The concentrates are charged to the reverberatory furnace at 1200° C. with fluxing materials to cause the charge to melt and form a fluid slag which is reduced by a suitable reductant such as coal to produce crude tin. The tin product from the first stage is sufficiently low in iron and other impurities to permit refining by conventional methods. The slag which contains typically 5 to 10% tin, must be granulated and treated in the second stage to recover this tin. It is mixed with additional reductant and treated at approx. 1400° C., to produce a discard slag containing 1.5 to 3 percent tin and a metallic product with a high iron content (hard-head) which is recycled to the first stage.

Low grade concentrates from hard-rock sources not only contain larger quantities of gangue minerals (and therefore produce large volumes of slag per unit of crude tin produced) but usually have higher iron-to-tin ratios, which leads to the formation of large quantities of high melting point hard-head with high iron content which cannot be dealt with in the normal two stage recycle. These two factors make it uneconomical to treat low grade concentrates in conventional smelters.

In the treatment of low grade concentrates it is usual to employ processes which involve a slag fuming operation to remove tin from the system either as a fume of stannous oxide SnO (by appropriate control of oxidation/reduction conditions) or as a fume of stannous sulphide SnS (by injection of sulphur or pyrites to control sulphidizing conditions, together with coal or a hydrocarbon fuel to control reduction conditions). Careful control of the charge composition and rates of addition of reagents is required to maintain fuming conditions without matte formation. Any matte which is formed is treated separately to recover its tin values or recycled as a sulphidizing agent. This type of slag-fuming operation is generally employed as a slag cleaning stage for slags derived from the first stage of conventional smelting operations. It allows the iron entering the smelter to be discharged in the discard slag, and thus avoids the buildup and excessive recycle of iron. In all such slag fuming processes the fuel and sulphidizing agent are injected into the slag layer, below its surface, and matte formation is avoided where possible. It is possible, though not usual, to charge concentrates which may or may not contain iron sulphides, to the fuming furnace.

This type of process is represented in the prior art by:
1. U.S. Pat. No. 2,304,197 Dec. 8, 1942, W. H. Osborn
2. D. V. Belyayev, The Metallurgy of Tin, Pergamon Press, Oxford, 1963, p. 88.

An alternative approach dispenses with both the preconcentration step and the conventional smelting step; it is basically an ore fuming process which is applicable to ores or blends which consist mainly of iron sulphide minerals with relatively small quantities of other minerals, including cassiterite.

It will be appreciated that the avoidance of the preconcentration stage and the use of a high-temperature fuming process on the whole of the ore as mined introduces some very special economic restraints. For a given production of tin from a 1% tin ore, as distinct from say a 20% concentrate, the total material throughput will be twenty times greater. Thus capital costs must be optimized and the specific throughput of the plant must be as great as possible, to retain economic viability.

Of even greater importance from the economic point of view is the cost of the energy required to heat the whole of the ore to the fuming temperature. In an ideal ore fuming process this heat must be supplied by burning of the components of the ore without the need for additional fuel. These processes are in general therefore only applicable to ores containing sufficient iron sulphides to provide all the process heat from their combustion. (Of course, if the ore is supplemented by concentrates containing a greater proportion of tin, it may become economical to use some supplementary fuel).

In brief, an ore fuming process should be a high intensity process with high specific throughput, and should be autogenous.

Two distinct variants of sulphide ore fuming processes have been described in the prior art. These are:

(1) Non-slagging processes which are applied to iron sulphide ores of the type for which the present invention is intended. In these processes the essential feature is that the temperature is maintained at a sufficiently high level to permit volatilization of tin sulphides to occur, but at a sufficiently low level to avoid incipient melting of the charge. The processes may thus be carried out in fluidized beds, multihearth roasters or shaft furnaces and the residues are free-flowing particulate solids. Such processes are represented in the prior art by the following patents:
1. U.S. Pat. No. 2,600,351—Wells, Thompson & Roberts, Dorr Company 1952
2. U.S. Pat. No. 1,847,991—Sulman & Picard 1932
3. Australian Pat. No. 3735/26—Krupp 1926.

(2) Slag forming processes applied to sulphide ores. This group of processes like group 1 is also applied to ores consisting mainly of iron sulphide minerals. In this group the temperature of the charge is allowed to rise sufficiently due to burning of the iron sulphide minerals that melting and slag formation occur and the final residue is an iron silicate slag. Formation of a matte is avoided if possible, but if it does form, it is collected in the hearth, tapped from time to time and treated to recover its tin content. This type of process is represented in the prior art by Trostler and Carlsson, U.S. Pat. No. 2,219,411 (1940) and Australian Pat. No. 109,112 (1939) and by Brovkin et al., Brit. Pat. No. 1,391,572 (1975).

(The present invention falls into this group, and is related to the process of Carlsson and Trostler, in that it is intended for the treatment of ores or concentrates consisting largely of iron sulphides with sufficient silica naturally occurring or deliberately added to cause all the iron produced in the residue from burning of the iron sulphides to form an iron silicate (fayalite) slag.

The molten slag is the residue from the process and is tapped for discard.

In the treatment of certain sulphidic tin ores from the West Coast of Tasmania, conventional mineral dressing treatments failed to achieve recoveries better than 30% with a concentrate grade of 30 percent tin. Thus conventional treatment involving preconcentration and smelting (even those smelting processes applicable to low grade concentrates) could not be applied.

Our early attempts towards development of an autogenous ore fuming process for treatment of these pyritic tin ores, involved the non-slagging approach, i.e. heating the ore in such a way that the tin was sulphidized and volatilized without allowing the temperature to rise to the level where slagging reactions could cause agglomeration and sticking of the charge. In this process the volatilization and recovery of tin is achieved in the following way:

(1) The ore is fed to a shaft or multi-hearth furnace co-currently with hot gases derived from combustion of residues in later stage (3). Co-current operation retains the partial pressure of sulphur released from the pyrite as the temperature of the ore rises.

(2) The gases from the co-current volatilization (stage (1)) containing sulphur, sulphur dioxide, carbonyl sulphide (COS), nitrogen, carbon dioxide and stannous sulphide, are collected and burnt to convert all sulphur and SnS to $SO_2$ and $SnO_2$. The gases are cooled and the $SnO_2$ fume collected.

(3) The heated residue from stage (1) which contains pyrrhotite, silica and minor amounts of other minerals is passed through a suitable lock system into a reactor where it is burned (by counter-current contact in a separate compartment) with air diluted by cooled tail gases from stage (2). The proportion of diluent is adjusted to limit the temperature of the burning mass to below the temperature of incipient fusion, while producing a sufficient volume of combustion gases of sufficiently high temperature to carry out the co-current heating of the ore.

When attempts were made to conduct this process autogenously in a simulated practical reactor system it was found to be impossible to achieve a suitable combination of gas temperature and gas volume from stage (3) without causing slagging reactions and consequent sticking and agglomeration of the reacting mass. Furthermore, even in the absence of these problems the practical difficulties associated with (a) balancing of reaction rates in the two stages, (b) transfer of gases at very high temperatures from stage (3) to stage (1) and pressure balancing between reaction zones, and (c) collecting fume from excessively large volumes of recycled gas, rendered the process unattractive.

The blast furnace pyritic smelting process described by Carlsson and Trostler appeared to offer the only remaining possibility in the prior art for the treatment of these ores. However tests conducted in a small shaft reactor showed that incipient fusion above the melting zone caused bridging of the charge, and the process could not be made to operate. There is no evidence in the literature that this blast furnace process was ever operated commercially.

The problem accordingly remained of finding a process for concentrating cassiterite from the ore which is not subject to the disadvantages of the prior art processes discussed above.

SUMMARY OF THE INVENTION

It has now been surprisingly found that the problems of heat and mass transfer described above can be overcome in a process in which the ore is added to a refractory lined reactor containing a pool of liquid iron sulphide matte which may be overlain by a liquid iron silicate slag, and the tin sulphide volatilization is achieved by a process akin to matte conversion. Such a process may be referred to as "matte fuming".

Thus, the present invention resides in a process for extracting tin values from a tin-bearing ore or mineral mix, wherein the ore or mineral mix is charged into a two-phase system comprising molten iron sulphide matte and liquid iron silicate slag and the matte is blown with oxidizing gas, the said ore or mineral mix containing relatively high proportions of iron, silica and sulphur-bearing materials such that when the matte is blown with the oxidizing gas, heat is generated through combustion of the matte thus supplying heat for melting the charge and driving off the tin values from the charge in the form of volatile sulphides and oxides.

One embodiment of the present invention involves charging of the ore or mineral mix into a bath of molten iron sulphide matte overlain by a residue of iron silicate slag, blowing the matte with oxidizing gas such as air to heat the matte through combustion of the iron sulphide to form iron oxide "FeO" and sulphur dioxide $SO_2$ thus supplying all the heat requirements for melting the charge and driving off the tin values from the charge in the form of volatile sulphides and oxides.

The iron oxide produced by the combustion of the matte combines at the surface of the matte with silica from the charge to produce an iron silicate slag which is maintained saturated with silica. This slag is the final residue from the process, and is discarded when its tin content has been lowered sufficiently by the fuming reactions.

The large quantity of gas which passes through the matte to bring about its oxidation sweeps out or scavenges the tin sulphide, which collects in the matte, by maintaining a very low partial pressure of tin sulphide in the large volume of gas bubbles. Our observations have shown that a substantial fraction of the tin contained in the particles of charge can be sulphidized and volatilized while the particles are actually being heated up in the reactor to the temperature of the bath and before they are incorporated into the slag or matte phases. Thus, although published studies of the vapour pressure of tin sulphides over tin-iron mattes would lead to the expectation of a substantial build up of tin in the matte and a corresponding equilibrium partition of tin in the slag, it is possible by correct operation of the present process and by correct sizing of charge particles to limit the extent to which the tin enters the matte. However, this does not set a limit on the production rate since the tin which does enter the matte is removed during the conversion of the matte. Furthermore, the gas has its oxygen and sulphur partial pressures fixed by the fact that it has equilibrated with the matte which is in turn equilibrated with the silica-saturated slag. Partial pressure for oxygen is approximately $10^{-8}$ atm and that for sulphur $10^{-1.5}$ atm and, therefore, very efficient fuming of tin from the slag is promoted as the large volume of gas passes through it, maintaining a very low tin concentration in the slag.

Some of the reactions involved in the process are as follows.

Heating of the charge of ore or concentrate:

$$FeS_2 = FeS_{(1+x)} + (1-x)S \quad (1)$$

$$FeCO_3 = \text{"FeO"} + CO_2 \quad (2)$$

$$SnO_2 + S_2 = SnS + SO_2 \quad (3)$$

$$2FeO + 1\tfrac{1}{2}S_2 = 2\text{"FeS"} + SO_2 \quad (4)$$

Oxidation and slagging reactions:

$$\text{"FeS"} + 1\tfrac{1}{2}O_2 = \text{"FeO"} + SO_2 \quad (5)$$

$$\text{"FeO"} + SiO_2 = 2FeO\cdot SiO_2 \quad (6)$$

$$2\text{"FeS"} + SiO_2 + 3O_2 = 2FeO\cdot SiO_2 + 2SO_2 \quad (7)$$

$$C + O_2 = CO_2 \quad (8)$$

$$2FeS + 3\tfrac{1}{2}O_2 = Fe_2O_3 + 2SO_2 \quad (9)$$

Reaction (7) is a combination of reactions (5) and (6) and is written for simplicity in stoichiometric form. However, experimental observations of a number of workers have established that some labile sulphur will always be evolved principally due to the non-stoichiometry of the slag formed.

In the operation of the actual process the matte and slag phases are much more complex than simple ferrous sulphide and ferrous silicate. Both are in fact "oxysulphide" phases containing ferrous oxide, ferric oxide, silicon and sulphur. The oxidation potentials of the matte and slag are related to their ferric oxide activities.

Our experiments have shown that the oxidation of some of the iron to the ferric state results in an enhancement of the heat released by the process, and it is advantageous to drive the process at a high rate to optimize the degree of oxidation of iron to the ferric state. The limit to the permissible extent of oxidation is set by the requirement to maintain phase separation between the matte and slag phases.

Thus, from another aspect, the present invention resides in a process for extracting the tin values from a tin-bearing ore or other material wherein the said material is fed into a refractory lined reactor containing a pool of molten iron sulphide matte, conditions in the reactor being such that the molten matte also acts as a heat transfer medium and a chemical buffer to maintain oxygen and sulphur partial pressures of the gas phase at such values as to promote sulphidizing of the tin to stannous sulphide and volatilization of the stannous sulphide from the matte itself, the over-lying slag layer and the particles of said material with which the gas comes into contact during the time in which these particles are being heated to the reactor temperature.

DESCRIPTION OF THE PREFERRED EMBODIMENT

Figure 1:
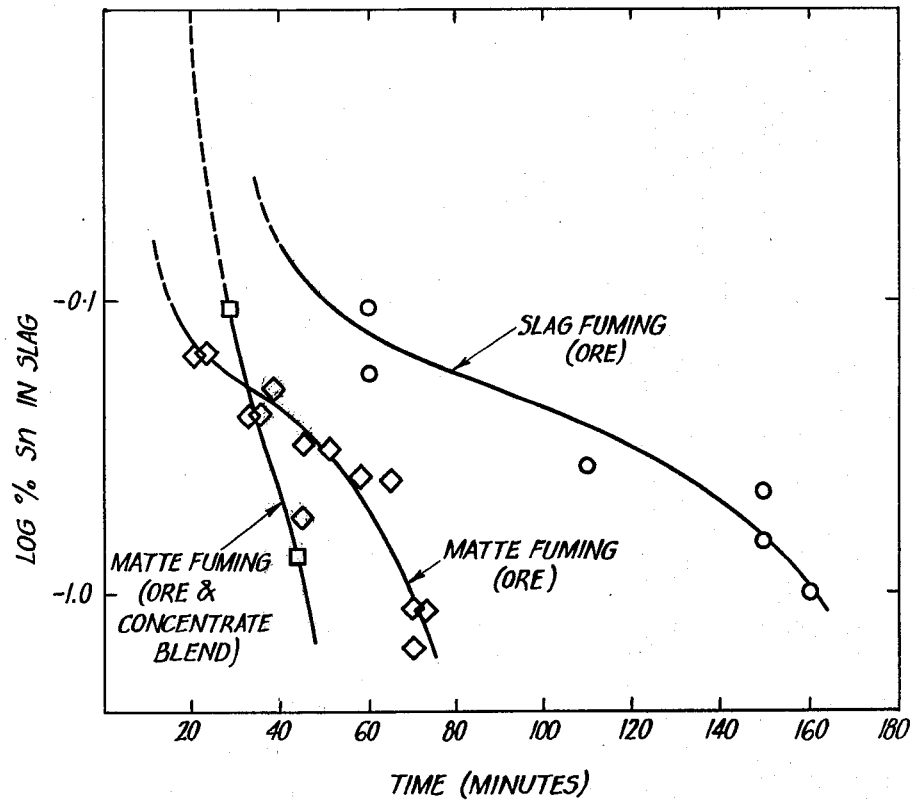

A typical process according to the invention may be carried out as follows:

Stage (1): A bath of iron sulphide matte saturated with ferrous oxide is maintained at a temperature above 1000° C., e.g. 1250° C., in a refractory-lined vessel equipped with lances or tuyeres to permit air to be blown through the matte. At the start of a new batch this matte, overlain by a thin layer of slag, remains from the previous batch. Its iron oxide content is fixed by equilibration with a silica saturated slag. Air is blown through the matte via the lances or tuyeres to convert iron sulphide to iron oxide which enters the slag.

Stage (2): Pyritic tin ore or a blended mixture of tin-bearing materials containing appropriate amounts of silica and iron sulphides (hereinafter referred to for convenience as "ore") is crushed to say −5 mm and added slowly to the reactor while maintaining the air blast to generate heat by combustion of the matte. In the preferred method of operation the ore is screened to separate the −1 mm fraction which is injected directly into the matte layer through the lances or tuyeres along with the air and supplementary fuel as required. The +1 mm fraction is charged onto the surface of the slag by means of an appropriate feeder. The rate of charge addition is adjusted to match the rate of production of heat and so maintain the matte and slag in the molten condition. The iron sulphide in the charge enters the matte, and during heating to the melting temperature, labile sulphur in the pyrite fraction of the charge is released. This is partly evolved as elemental sulphur and partly consumed in sulphidizing the iron oxides and carbonates and tin oxide in the ore particles and in the matte and slag baths. The net result is a large increase in the amount of matte consequent upon the addition of the charge. The silica fraction of the ore particles combines with the iron oxide which is produced by conversion of the matte, forming more slag which gradually increases in volume at the expense of the matte. If the charge is not self-fluxing, additions of pyrrhotite (which may contain tin) or siliceous materials may be made to adjust the iron-to-silica ratio to produce a suitable slag. The violent agitation of the bath causes the matte and slag to splash over the added ore particles and provides rapid heat transfer.

Stage (3): After completion of ore addition, blowing is continued until the stoichiometric oxygen has been supplied to convert all the new iron sulphide matte resulting from the addition of the charge of ore. During this stage the tin which enters the slag and matte is fumed off.

Stage (4): The bulk of the slag is tapped for discard leaving the original quantity of matte overlain by some slag for the next batch.

During all the above stages the air blast may be continued to maintain a continuous $SO_2$ feed to an acid or sulphur plant.

The gases leaving the bath contain $N_2$, $S_2$, $SO_2$, $CO_2$, SnS and SnO. These gases would usually be burned with stoichiometric air above the slag and pass through a waste heat boiler and fume collection system (as in conventional slag fuming) to an acid plant.

The matte gradually accumulates copper and precious metals and is tapped from time to time to bleed these metals from the system.

In an alternate mode of operation the ore is added continuously at a location as far as possible from the slag exit point. A sufficient volume of slag is maintained in the reactor to ensure a residence time such that fuming proceeds to the stage that the level of tin in the slag is sufficiently low for discard. The slag may be tapped either continuously or intermittently.

Although this process is autogenous when treating the ores for which it was developed, it is possible to supply extra heat by burning carbonaceous fuel or blowing with oxygen-enriched air in cases where the heat balance may not be favourable.

Irrespective of the mode of operation chosen, it is a simple matter to adjust the heat balance and the oxygen balance of the reactor by injection of mixtures of fuel and air in an appropriate ratio. Thus if the sulphur content of the matte becomes depleted but more gas needs to be swept through the system to ensure that fuming goes to completion, this gas and the required heat can be supplied by burning a carbonaceous fuel or pyrrhotite concentrate and adjusting the fuel/air ratio to balance the oxygen-to-sulphur ratio in the matte, thus maintaining the necessary conditions of stirring and gas stoichiometry for effective fuming. Whether a sulphide or a carbonaceous fuel is used depends in turn on the iron-to-silica ratio in the feed to the process.

It will be obvious to those skilled in the art that the process described above is most closely related to the blast furnace pyritic smelting process described by Carlsson and Trostler and the slag fuming process described by Brovkin et al.

However the present process differs in three important respects from the blast furnace process, namely:

1. The present process is a pneumatic matte conversion process conducted in a converter in which a bath of matte is continuously maintained and the air is blown through lances or tuyeres below the surface of the matte layer, which plays a predominant role in the chemistry, the heat transfer and the mass transfer processes taking place. In the blast furnace pyritic smelting operation it was not desirable to produce a matte, and the matte, if formed, did not play a prominent part in the reactions occurring in the bosh of the blast furnace.

2. In the blast furnace process it was necessary to carry out careful blending and preparation of the charge to promote conditions in the tuyere zone of the blast furnace such that combustion of the iron sulphides and formation of the slag could occur without causing bridging. In the present process the physical nature of the charge is not important. It is necessary only to crush the ore to a size suitable for easy handling and feeding onto the surface of the slag. Mixing of the charge with the matte and slag is assisted by the violent agitation in the bath.

3. In the earlier blast furnace process the matte, if it is produced, and slag, once formed, drip into the hearth below the tuyeres and are not subject to any further fuming reactions in the furnace. Both products must be collected and treated separately. The inventors claim a subsequent slag treatment stage and describe a separate treatment of matte if it should form.

In the present process the matte and slag are both subjected to the scrubbing action of a large volume of sulphidizing gas (generated by "conversion" of the matte and buffered chemically by the matte) during the entire residence time of the charge, and this reduces the tin content of both slag and matte to a low level and maintains a sulphidizing atmosphere around the charge particles. This buffering of the gas by its contact with a permanently maintained volume of matte distinguishes the present process from the prior art.

The present process differs from the "slag fuming" process of Brovkin et al. in the following ways:

(1) Slag fuming is carried out in a water-cooled steel-jacketted furnace which is operated in a way which avoids " . . . accumulation of sulphides of metals in the funace and formation of a matte as a bottom phase which could result in a dangerous breakage of the coffer-work elements in the fuming furnace . . . " (p. 1, lines 72–77). The bath consists almost entirely of slag, which is the reaction medium, some of which solidifies on the water cooled walls and hearth to provide a protective wall of solid slag. Although matte is formed by melting of the sulphides added in the charge, this matte remains dispersed as droplets throughout the slag and reacts in the slag with the air and fuel so that a steady state is reached in which the following conditions are satisfied:

(a) the sulphides are consumed as rapidly as they are added, (b) the sulphur content of the mixture of slag and dispersed matte is not permitted to rise above six percent (above which the matte will form a separate bottom phase).

By contrast in "matte fuming" as presently proposed, a permanent matte pool is always retained as the reaction medium and fuel for the process, and its sulphur content is maintained above 16 percent to limit magnetite formation. The slag layer is a product of the reaction and is not itself the reaction medium. Matte fuming cannot be carried out in a water jacketted vessel designed for slag fuming.

(2) The operating procedure of the two processes is quite different. In the "slag fuming" process of Brovkin et al it is necessary to tap two thirds of the slag after each operating cycle and retain one third as the reaction medium for the next cycle. In matte fuming the whole slag can be tapped after each cycle of operation in the batch mode, but a constant volume of matte is always retained as the reaction medium. The sulphides added in the charge initially melt and become incorporated into the matte pool.

(3) As a consequence of retaining a matte phase it is possible to recover copper and precious metals by allowing them to accumulate in the matte phase during the matte fuming operation. This is not possible in the slag fuming operation in which dispersed particles of matte are discarded with the slag.

(4) In the Brovkin process a carbonaceous or hydrocarbon fuel must be used because the gases entering the reactor come directly into contact with the slag, and must therefore be heated to a temperature approaching the temperature of the slag by combustion of some fuel at the mouth of the tuyeres. This fuel requirement is stated by Brovkin et al, in terms of a permitted air-to-fuel ratio of between 1.7 and 0.9 times the theoretical requirement for burning the fuel. This fuel serves the dual functions of supplying extra process heat and of preventing formation of excessive magnetite in the slag.

By contrast in the matte fuming process the fuel is the *molten matte* into which the air is blown. Our test work (consistent with industrial experience in copper converting) shows that the reaction between molten matte and cold air is extremely rapid, leading to rapid and complete consumption of the air at its point of entry. We have shown that fuel burns very rapidly when injected into the matte with its theoretical air requirement and is able to supply any additional heat required to offset heat losses. Thus, the air-to-fuel ratio is many times higher than 1.7 and may be unlimited, that is to say, no carbonaceous or hydrocarbon fuel at all may be required.

The most important distinction between the "slag fuming" and "matte fuming" processes is the vital chemical buffering effect of the matte which controls both the sulphur and oxygen potentials of the gases in the reactor all of which pass through the matte pool.

Thus in the matte fuming process where the matte is continually replenished with iron sulphide from the feed, it is found that even in complete absence of auxiliary fuel the gases leaving the matte and entering the slag are sufficiently sulphidizing and reducing to prevent excessive magnetite formation in the slag. Fuel, if used for offsetting heat losses, does not play an essential role in the chemistry of the process.

(5) Small-scale experiments have been conducted to simulate the matte fuming and slag fuming processes. The results reported in example (14) below show that matte fuming leads to far greater rates of recovery of tin.

With regard to the rate at which the reactions occur, the present process may be likened to the new group of high-intensity processes which have been introduced for the smelting of copper, to replace the conventional blast furnace and reverberatory furnace, namely, the Noranda Process (see Extractive Metallurgy of Copper, Ed. Yannopoulis and Agarwal, AIM, New York 1975, Ch. 23, the Mitsubishi process (Ibid. chap. 22), both of which employ a type of converter. A recently published patent for continuous lead smelting also follows the same trend (U.S. Pat. No. 3,663,207). Similar intense processes employing submerged combustion to supply heat and reductant have been described, e.g. zinc fuming (Australian Pat. No. 429,266) and recovery of tin from slags (Australian Pat. No. 465,531).

The following non-limitative examples illustrate features of the process:

EXAMPLE 1

300 grams of an iron sulphide matte of the approximate composition 67% iron, 29% sulphur, 4% oxygen was melted in an induction furnace in a non-oxidizing atmosphere. The furnace was instrumented to act as a reaction calorimeter that could measure net heats of reaction, with the intention of determining if the process described was autogenously heated.

When the temperature of the molten matte reached 1250° C., 300 g. of a pyritic tin ore, crushed to $-\frac{1}{4}''$, was added slowly to the matte surface over a period of five minutes. Pyrite constitutes about 50% by weight of the ore composition. Other sulphides present are sphalerite, pyrrhotite, galena, chalcopyrite and stannite. Quartz and chert make up about 20% of the ore, other silicates present in minor amounts being chlorite, iron silicates and topaz. Carbonates which make up about 14% of the ore are represented by siderite, ankerite and huntite. Iron oxides make up about 4.0% of the ore, while small amounts of rutile, fluorite and apatite are also present. Cassiterite is present in an amount of about 2% by weight.

During the ore addition stage, some labile sulphur and stannous sulphide were evolved. Once the ore had been added, air was admitted to the matte at a rate of 3 liters/minute via a ceramic lance that had been inserted in the bath. Vigorous oxidation occurred and the rate of tin sulphide evolution increased markedly. Minor amounts of sulphur were continuously evolved. The amount of air required was calculated on the basis that all iron in the ore would be oxidized to FeO, which would then combine with silica from the ore to form a fayalite slag. In the present example, the ore analysed 26.3% iron, from which 41.3% iron sulphide could be formed.

In 300 g of ore, therefore, $$300 \times 0.413 = 123.9 \text{ gm of FeS}$$
$$= 1.40 \text{ moles}/300 \text{ g ore}.$$

The oxidation reaction is $$FeS + 1\frac{1}{2}O_2 = FeO + SO_2 \qquad (5)$$

therefore, $1.4 \times 1\frac{1}{2}$ moles of oxygen is required to oxidize the available iron in the ore.

$$\text{Amount of oxygen} = 1.4 \times 1.5$$
$$= 2.11 \text{ moles}$$

The amount of air is therefore:

$$2.11 \times (1/0.21) = 10.05 \text{ moles}$$

At S.T.P., the volume required is $$10.05 \times 22.4 = 225.3 \text{ liters}$$

Therefore, at the addition rate of 3 l/min., 75 minutes of oxidation would deliver the stoichiometric amount of oxygen required. This amount of air was then added to the bath and at the end of this time, the net heat of reaction was measured and found to be exothermic, therefore demonstrating the autogeneity of the process. The air was then stopped and the system cooled to room temperature under non-oxidizing conditions. The crucible was sectioned and the contents examined and analysed. Two distinct phases were present:

(1) A matte phase that weighed 340 gm and analyzed 26% S, 2% $SiO_2$, 65% Fe and 7% Oxygen, which was similar in composition to the original matte. The matte analysed 0.15% Sn.

(2) A slag phase weighing 168 g which was silica saturated fayalite containing particles of silica and analysed 20% Si and 32% Fe. The tin analysis of the slag was 0.11%, thus enabling an extraction efficiency to be calculated.

| | Results | | | |
|---|---|---|---|---|
| Product | Weight gm | % Wt | % Sn | % Sn Distribution |
| Matte | 340 | 56.7 | 0.15 | 5.3 |
| Slag | 168 | 28.0 | 0.11 | 1.9 |
| Volatiles | 92 | 15.3 | * | 92.8 |
| Feed | 600 | 100.0 | 1.6 | 100.0 |

*A sample of tin oxide analysed 59.2% Sn.

The above example illustrated that high extractions of tin can be obtained from pyritic tin ores using the sulphur in the ore as a heat source.

EXAMPLE 2

300 g of matte from the previous example, which contained 0.1% Sn, was used as the starting material for the second example. A similar procedure was followed and the same quantity of air added. The purpose of this experiment was to determine if any buildup or decrease of metals, such as copper, tin and gold occurred in the matte phase, and if any detrimental decrease of sulphur or iron occurred, that would change the exothermic character of the overall reactions.

Measurements indicated that the net heat of reaction was still exothermic, but slightly less so than in the previous example.

No buildup of tin in slag or matte had occurred. Copper and gold concentrations in the matte had increased from 0.02 to 0.04% Cu and 3 ppm to 5 ppm Au respectively.

| Product | Results Weight gm | % Wt | % Sn | % Sn Distribution |
|---|---|---|---|---|
| Matte | 302 | 50.3 | 0.15 | 4.7 |
| Slag | 207.4 | 34.6 | 0.11 | 2.3 |
| Volatiles | 90.6 | 15.1 | — | 94.0 |
| Feed | 600.0 | 100.0 | 1.60 | 100.0 |

EXAMPLES 3 AND 4

Two more tests using recycled matte were conducted to show the effect of using matte that had been recycled four times.

The net overall heat of reaction was still exothermic, but only very slightly. In addition, the weight of matte had decreased, with a sympathetic increase in slag weight.

Concentrations of tin in the slag had decreased to 0.09% Sn in the case of example 3 and 0.07% Sn in the case of example 4. Concentration of tin in the matte had decreased to 0.22% Sn after the fourth cycle.

| Product | Results (Test 4) Weight gm | % Wt | % Sn | % Sn Distribution |
|---|---|---|---|---|
| Matte | 273.0 | 45.5 | 0.12 | 3.4 |
| Slag | 232.0 | 38.7 | 0.07 | 1.7 |
| Volatiles | 94.8 | 15.8 | — | 94.9 |
| Feed | 600.0 | 100.0 | 1.6 | 100.0 |

Copper and gold in the matte had built up to 0.1% and 9 ppm respectively.

The above experiments demonstrated that a batch-type system would be suitable provided that levels of tin in the slag and matte were acceptable and could be reduced if required. It was also clear that valuable metals could gradually be concentrated in the matte phase.

EXAMPLE 5

Matte and slag from experiment 4 were both recycled and heated to 1250° C. under a non-oxidizing atmosphere.

The feed materials were therefore 250 g of matte assaying 0.12% Sn and 220 g of slag assaying 0.07% Sn. In this experiment no fresh ore was added and 100 liters of air were added at 3 l/min. to further oxidize the matte. The net heat of reaction was exothermic and the level of tin was reduced markedly in both slag and matte.

| Product | Results Weight gm | % Wt | % Sn | % Sn Distribution |
|---|---|---|---|---|
| Matte | 194.1 | 41.3 | 0.04 | 16.5 |
| Slag | 215.3 | 45.8 | 0.03 | 13.7 |
| Volatiles | 60.6 | 12.9 | — | 69.8 |
| Feed | 470.0 | 100.0 | 0.10 | 100.0 |

This test showed that any buildup in tin in slag or matte could be overcome by addition of extra air. However, the gradual loss in weight of matte may eventually result in the reactions being net consumers of heat, with the periodic make-up of fresh matte then being an essential requirement in batch type processes.

EXAMPLE 6

Using 300 g of a fresh matte sample, and 300 g of ore, the air flowrate was doubled to 6 liters/min. Consequently, oxidation time was halved to 37 minutes.

Results were as follows:

| Product | Weight gm | % Wt | % Sn | % Sn Distribution |
|---|---|---|---|---|
| Matte | 354.0 | 59.0 | 0.12 | 4.4 |
| Slag | 166.2 | 27.7 | 0.07 | 1.2 |
| Volatiles | 79.8 | 13.3 | — | 94.4 |
| Feed | 600.0 | 100.0 | 1.60 | 100.0 |

This test showed that equally good extraction could be obtained using double the air addition rate. The net reaction was measured as exothermic.

Micrographic examination of the slags and mattes from the above series of tests showed that a considerable quantity of magnetite waas present in all samples.

EXAMPLE 7

Experiment 1 was repeated using a finer sized ore feed ($-12+30\#$ B.S.S.) to indicate if reactions were increased with a finer crushed ore. Results show that an improvement in recovery is possible with finer feed.

| Product | Results Weight gm | % Wt | % Sn | % Sn Distribution |
|---|---|---|---|---|
| Matte | 353.4 | 58.9 | 0.08 | 3.0 |
| Slag | 156.6 | 26.1 | 0.03 | 0.5 |
| Volatiles | 90.0 | 15.0 | — | 96.5 |
| Feed | 600.0 | 100.0 | 1.60 | 100.0 |

EXAMPLE 8

As the process had been successfully tested using a pyritic tin ore, it was decided to test a different type of ore. The ore selected was a pyrrhotitic tin ore of the following approximate composition:

1.2% Sn
36.0% Fe
22.0% S
0.9% $CO_2$
21.0% $SiO_2$

The mineralogical composition of the ore was:
55–60% FeS (pyrrhotite)
1–2% $SnO_2$ (cassiterite)
3% $FeCO_3$ (siderite)
21–25% $SiO_2$ (quartz)
5% Iron Oxides
5% Gangue and other minerals such as fluorite, dolomite and iron silicates.

The cassiterite was mainly combined with quartz and was considerably coarser in grainsize than the pyritic tin ore. The ore was crushed and screened to $-12\# +36\#$ B.S.A. The stoichiometric amount of air required was calculated on the basis of 22.0% S in the ore. Therefore, in 300 g, based on sulphur analysis, 60.5% FeS is possible=2.06 moles.

$$\text{Oxygen required} = 3.09 \text{ moles}$$
$$\text{Air required} = \frac{3.09}{0.21} \times \frac{22.4}{1}$$

-continued
= 330 liters at S.T.P.

A similar experimental procedure to that described in Example 1 was used. Once again labile sulphur and stannous sulphide were evolved prior to and during addition of air. $SO_2$ was also detected in the off gases. The net reaction was very exothermic. This was principally due to the extra heat evolved from the extra available pyrrhotite, and elimination of heat required to remove the labile sulphur from pyrite.

Extraction of tin into the volatile fumes was comparable to the pyritic ore.

| Product | Results Weight gm | % Wt | % Sn | % Sn Distribution |
|---|---|---|---|---|
| Matte | 427.2 | 71.2 | 0.10 | 5.9 |
| Slag | 139.8 | 23.3 | 0.08 | 1.5 |
| Volatiles | 33.0 | 5.5 | — | 92.6 |
| Feed | 600.0 | 100.0 | 1.20 | 100.0 |

This test demonstrated that pyrite was not essential for the success of the process and that satisfactory tin extraction could be achieved from a pyrrhotitic tin ore. However, the increase of matte in the process indicated that more oxidation air, or alternatively more silica, would be required to balance the Fe/Si ratio in the slag.

EXAMPLE 9

A third ore type, largely siliceous, was tested. The ore analysis was:
0.98% Sn
4.0% S (as pyrite and pyrrhotite)
15.0% Fe
29.0% Si
2.0% $CO_2$ The ore mineralogical composition was approximately

| | |
|---|---|
| 1.3% | $SnO_2$ |
| 7–8% | $FeS_2$ and FeS |
| 60% | $SiO_2$ |
| 4% | $FeCO_3$ |
| 10–15% | Iron oxides |
| 5% | Fluorite |
| 5–19% | Other minerals |
| 100.0% | Ore size was −12# B.S.S. |

The test procedure was similar to Example 1. 300 g of matte was melted and maintained at 1250° C., to which 300 g of the siliceous tin ore was added and the stoichiometric amount of air added to oxidize all sulphur in the ore, assuming that all of it sulphidized from iron to iron sulphide. This was calculated at 41 liters of air and this was bubbled through the bath at 3 l/min. Once again, stannous sulphide and sulphur vapour were evolved, but after 5 minutes of oxidation, the amount of sulphur decreased in favour of an increase in sulphur dioxide.

The net heat of reaction was endothermic due to the low sulphur levels in the ore. However tin extraction was reasonably good.

| Product | Results Weight gm | % Wt | % Sn | % Sn Distribution |
|---|---|---|---|---|
| Matte | 308.4 | 51.4 | 0.23 | 12.0 |
| Slag | 229.1 | 38.1 | 0.12 | 4.7 |
| Volatiles | 62.9 | 10.5 | — | 83.3 |
| Feed | 600.0 | 100.0 | 0.98 | 100.0 |

This indicated that a largely siliceous tin ore, of relatively large cassiterite grainsize could be treated using the matte fuming technique. However, a fuel source such as pyrrhotite or carbonaceous fuel would be required to provide heat. The pyrrhotitic tin ore described above would be a suitable fuel and fluxing agent for the siliceous ore. Alternatively, the siliceous ore could be added to the pyritic or pyrrhotitic ores to aid fluxing and adjust the iron-silica ratio of the feed to suit process requirements.

EXAMPLE 10

The next logical step was to blend the pyrrhotitic and siliceous ores to present a suitable feed from both a heat balance and fluxing viewpoint.

A mixture of 75% pyrrhotitic ore and 25% siliceous ore resulted in a feed assaying:
1.15% Sn
17.5% S
30.8% Fe
16.5% Si The size of the composite ore was −12# B.S.S. Using the normal procedure, it was calculated that the stoichiometric amount of air required (based on 17.5% S) was 262.5 liters. This was bubbled through a mixture of 300 g of ore and 300 g of matte and the net heat of reaction was measured as exothermic. The fluidity of the slag was noticeably better than any previous experiment, and fuming rates of tin sulphide and sulphur were substantial.

| Product | Results Weight gm | % Wt | % Sn | % Sn Distribution |
|---|---|---|---|---|
| Matte | 373.2 | 62.2 | 0.09 | 5.0 |
| Slag | 171.6 | 28.6 | 0.15 | 3.8 |
| Volatiles | 55.2 | 9.2 | — | 91.2 |
| | 600.0 | 100.0 | 1.15 | 100.0 |

This experiment demonstrated that by blending ores to obtain a suitable feed from both a slag-forming and heating viewpoint, good extractions of tin were possible and reactions could be made exothermic.

EXAMPLE 11

Previous tests demonstrated the features of the process on a batch basis, by recycling cold matte.

However, the gradual decrease in matte weight indicated slight overoxidation due to the distillation of sulphur when adding ore. Consequently, less than the theoretical amount of sulphur was available as fuel, so it was decided to reduce the amount of air by 10%, the aim being to maintain a constant matte weight and autogeneous heating.

Two kilograms of iron sulphide was melted under nitrogen in a crucible and the temperature maintained at 1230° C. Air was added at 10 liters/min. to the bath and 2 Kg of pyritic tin ore added as 200 g batches every two minutes. The calculated amount of air, 1600 l, was added and the matte and slag then allowed to settle for ten minutes under nitrogen cover gas.

Slag was then poured from the crucible via an attached spout and the matte and a thin slag layer retained in the crucible as the starting matte for the next cycle. This initial slag analysed 0.12% tin.

In all, the above cycle was repeated eight times and after the final cycle, matte was also poured from the crucible. Clearly, this test was a more realistic demonstration of the process capabilities under semi-continuous conditions. All slags and matte were weighed and assayed for tin, sulphur and iron.

The amount of slag tapped varied from 30% to 40% of the weight and the tin level decreased from 0.12% Sn to 0.08% Sn after three cycles and levelled off at about 0.06-0.08% Sn for the remaining cycles. Losses to slag were always less than 5% of the tin distribution. Sulphur levels in slag were always less than 4% S and iron levels between 30-40%.

The matte assayed 0.09% Sn, 64.1% Fe and 20.9% S and represented 52.3% of the weight, thus showing that the matte bath could be maintained over a long run. Less than 4% of the tin from the last cycle was retained in the matte.

Overall, the heat balance was slightly exothermic indicating that the process was potentially autogeneous.

EXAMPLE 12

A large scale test was carried out in which 90 Kg of pyritic tin ore (0.93% Sn) was treated in a 50 Kg capacity refractory lined vessel similar to that described by J. M. Floyd in Paper 3.5, Fourth World Conference on Tin, Kuala Lumpur 1974. Oil to cover furnace heat losses and air sufficient for oil and ore oxidation were delivered into the bath via a lance, thus utilizing the submerged combustion technique to overcome heat losses. Ore crushed to $-\frac{1}{4}''$ was fed onto the surface of the bath at 30 Kg/hr for the first hour and then at twice the rate for the remainder of the test. Significant heat was generated and the temperature was maintained above 1300° C., and approached 1400° C. when the addition rate was doubled, indicating that the process was close to being autogeneously heated.

Two quantities of slag were tapped and the fume was collected after the test. Over 95% of the tin was extracted and slag tin levels were lower than in any previous tests, indicating that continuous, small increment feeding was at least as good as batch feeding. The rate of tin elimination was obviously very fast.

Maximum tin concentration in slags was 0.09% Sn and the average slag assayed 0.063% Sn.

Fume analysed 45% Sn and was contaminated to some extent by ore and slag dust.

EXAMPLE 13

A second large scale test was conducted in which the ore, crushed to $-\frac{3}{8}''$ was screened through a 10 mesh BSS screen. The fine fraction amounting to 20% of the feed was injected into the matte bath through the lance, while the coarse fraction was fed at a constant rate onto the surface of the molten bath. In other respects the test was identical with example 12.

The maximum tin concentration in the slag was 0.08% Sn and average slag assayed 0.05% Sn.

The fume from this test was noticeably cleaner, and contained 55% Sn.

This example shows the improvement resulting from the avoidance of loss of fines during feeding of the ore.

EXAMPLE 14

To demonstrate the advantage of retaining a matte bath as reaction medium, two crucible tests were conducted in which slag samples were taken during the fuming operation after addition of 1.6 kg. of Queen Hill ore. In one of these tests the ore was added to a starting bath of 2 kg. of matte (i.e. a matte fuming test) while in the other, the ore was added to a starting bath of 2 kg. of slag (i.e. a slag fuming test). In each case the theoretical air requirement was blown through the charge at the rate of 5 liters per minute. The variation of tin content of slag with time is shown in FIG. 1, which shows that the rate of fuming of tin was approximately twice as fast in the matte fuming test as in the slag fuming test, although the tin content of the slag in both cases was reduced to a low value.

Moreover, analysis of the gases leaving the reactor showed that whereas in the matte fuming operation the oxygen was not detectable, in the slag fuming test oxygen contents of 2 to 5 percent were recorded. A bath of 150 g. of matte remained after slag fuming, showing incomplete reaction.

The tests showed that under comparable conditions the matte fuming procedure allows more efficient utilization of the air and the fuel value of the sulphides, and that the rate of fuming is greater than with the slag fuming operation.

In the following claims the term "ore" is to be understood as including concentrates or othe mineral mixes.

What is claimed is:

1. A process for extracting tin values from a tin bearing iron sulphide ore containing silica, comprising charging said ore in particulate form into a refractory-lined reactor containing a pool of molten matte under temperature conditions such that said iron sulphides in said ore become molten and enter the matte pool, blowing oxidizing gas through the matte pool to oxidize said added iron sulphides thus producing iron oxide and generating the heat and gases required to smelt the charge and drive off the tin values from the charge in the form of volatile sulphides and oxides, said iron oxide combining with silica in the charge to form a layer of molten slag which floats on the matte bath, the conditions in the reacting mass being such that the oxidizing gas blown into the reactor always comes first into contact with the bottom pool of molten matte, the pool of molten matte being maintained in the reactor to act as a chemical buffer to stabilize the oxygen and sulphur partial pressures of said gases in a suitable range to sulphidize and volatilize the tin in the charge, withdrawing and collecting the volatilized tin values and withdrawing tin-depleted slag from the reactor.

2. A process as claimed in claim 1, wherein auxiliary fuel is added to the reactor and is burnt to offset heat losses from the reactor.

3. A process as claimed in claim 2, wherein said auxiliary fuel is carbonaceous fuel.

4. A process as claimed in claim 2, wherein said auxiliary fuel is selected from the group consisting of pyrrhotite and pyrite.

5. A process as claimed in claim 1, wherein additions of iron sulphide minerals or siliceous materials are made in order to adjust the iron-to-silica ratio in the slag.

6. A process as claimed in claim 1, wherein the gases containing the volatile sulphides are burnt and the tin values collected in a fume collection system.

7. A process as claimed in claim 1, wherein the sulphur content of the matte is maintained at not less than 16 percent.

8. A process as claimed in claim 1, wherein the matte is tapped from time to time to recover metals which accumulate therein.

9. A process as claimed in claim 1, wherein the ore is added continuously and a sufficient volume of slag is maintained to ensure a residence time such that fuming proceeds to the stage that the level of tin in the slag is sufficiently low for discard.

10. A process as claimed in claim 1, wherein the oxidizing gas is blown through tuyeres or lances below the surface of the matte layer.

11. A process as claimed in claim 1, wherein slag, after allowing any matte particles dispersed therein to settle out, is tapped for discard from time to time.

12. A process as claimed in claim 1, wherein the oxidizing gas is air.